United States Patent [19]

Yartz

[11] 4,260,278
[45] Apr. 7, 1981

[54] FASTENING ASSEMBLY

[75] Inventor: Johnny W. Yartz, Anchorage, Ky.

[73] Assignee: General Electric Company, Louisville, Ky.

[21] Appl. No.: 970,703

[22] Filed: Dec. 18, 1978

[51] Int. Cl.³ .............................................. B25G 3/00
[52] U.S. Cl. .................................................. 403/260
[58] Field of Search ............................... 403/258, 260; D25/70–79; 264/328, 329; 425/DIG. 49

[56] References Cited

U.S. PATENT DOCUMENTS 3,816,011  6/1974  Biebuyck et al. ................ 403/260 X

OTHER PUBLICATIONS

Book: "Injection Molding of Plastics" by I. Thomas, published in 1947 by Reinhold Publ. Corp., 330 W. 42nd St., N.Y., N.Y. p. 312 cited, note FIG. V-12.

Primary Examiner—Werner H. Schroeder
Attorney, Agent, or Firm—H. Neil Houser; Radford M. Reams

[57] ABSTRACT

A fastening assembly is provided for securing structural parts at least one of which has an externally exposed appearance surface. Mounting bosses protruding from the wall of the appearance surface have a longitudinally extending cavity formed therein which is substantially parallel to the exposed surface and is located a distance from the surface approximately equal to the thickness of the wall. The cavity may be configured to receive a screw, or, alternatively, a separate screw receiving passageway may be located tangential to or independent of the cavity for securing the parts together.

12 Claims, 9 Drawing Figures

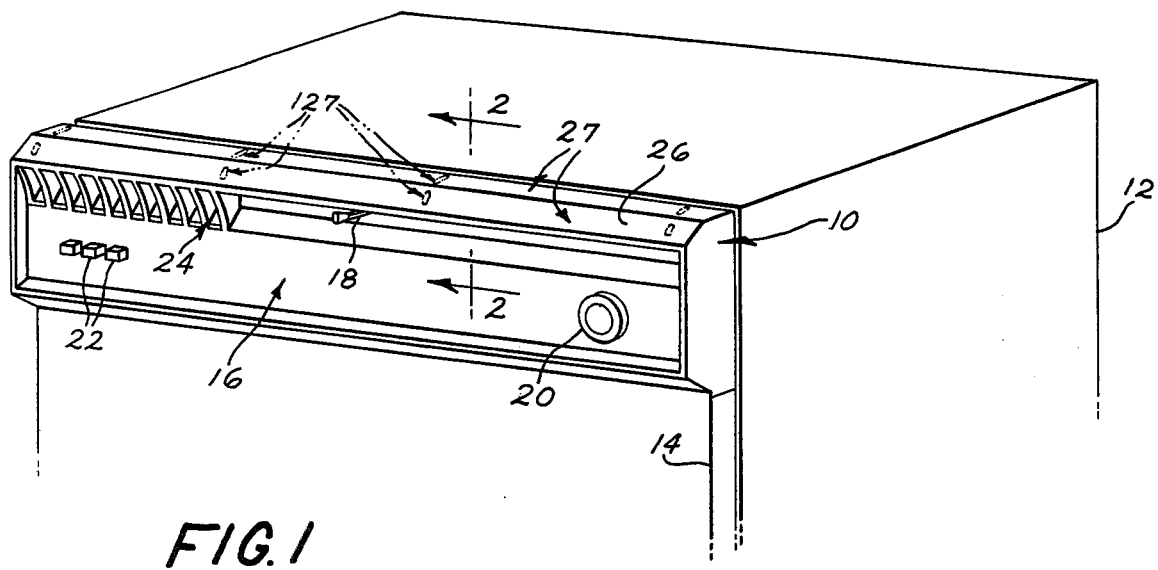
FIG. 1
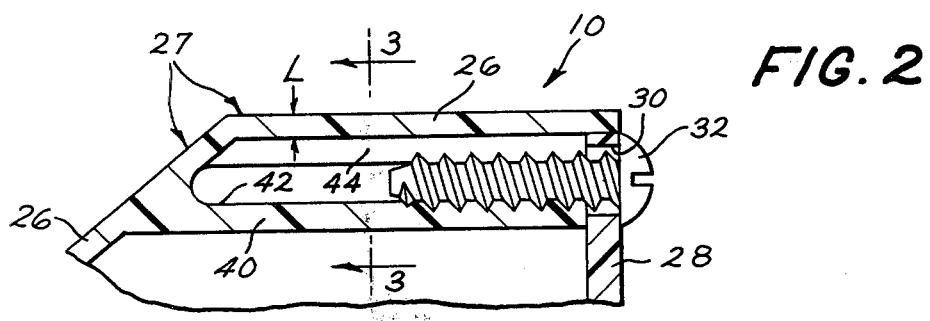
FIG. 2
FIG. 6    FIG. 3
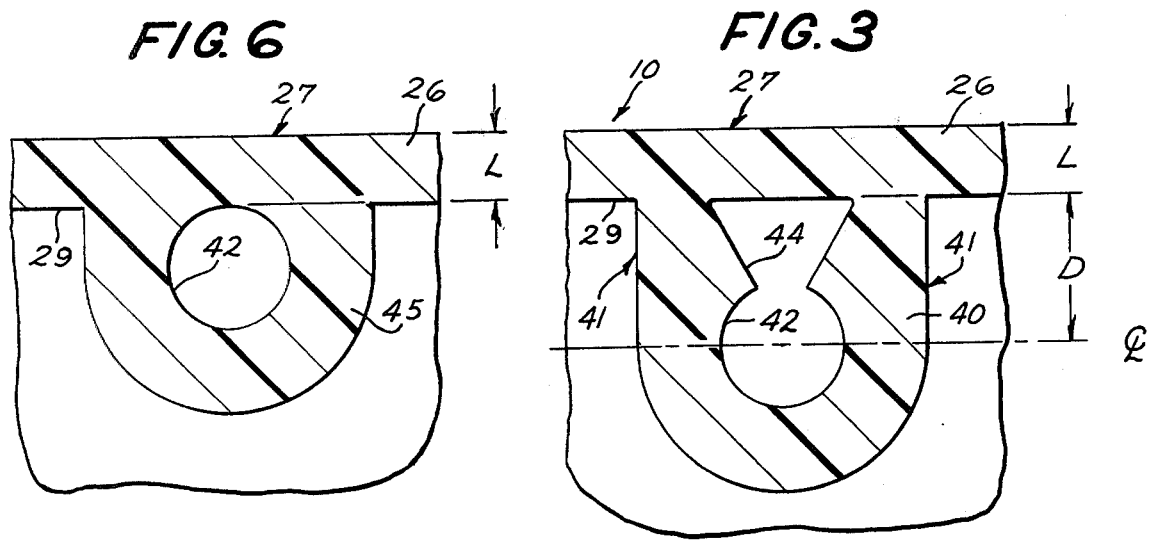

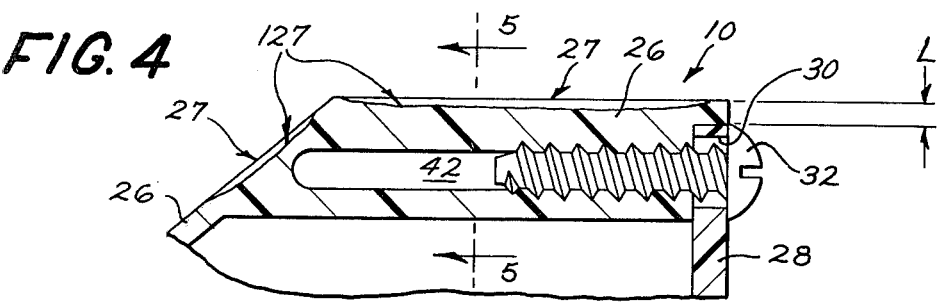
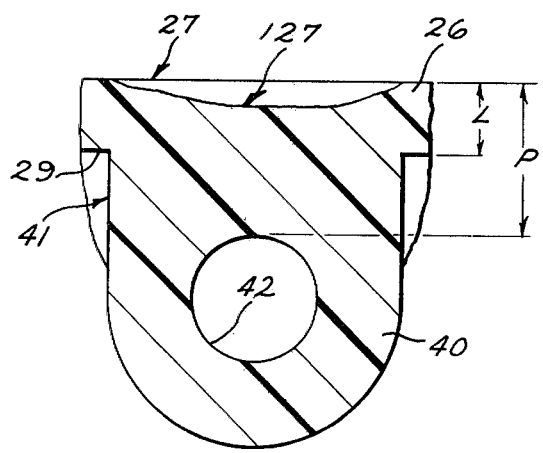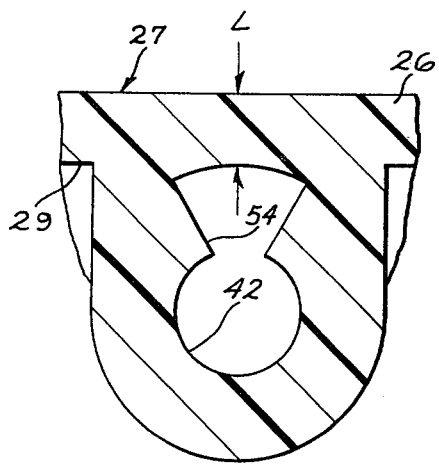
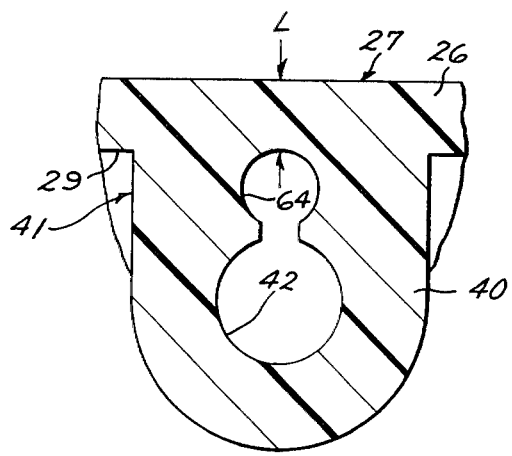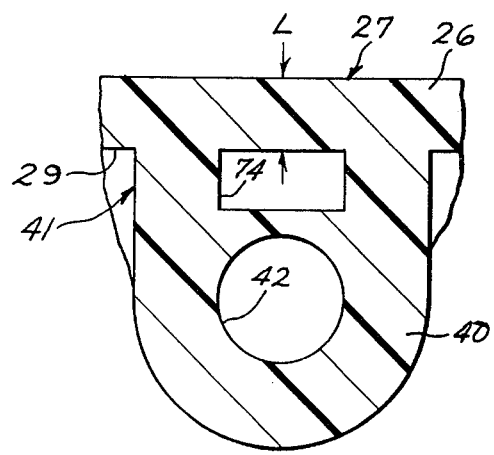

FASTENING ASSEMBLY

BACKGROUND OF THE INVENTION

There are numerous applications of plastic parts where bosses are molded integrally with the plastic part and appropriately "cored out" to receive screws for mechanical fastening. In many applications, where the bosses are integral to an appearance surface, the abrupt wall-section change at the location of the boss causes surface blemishes on the appearance surface, commonly referred to as "sink marks." It has been known to provide a thin interconnecting web between the wall section and the cylindrical screw receiving boss to prevent sink marks. However, this normally sacrifices structural stability and, further, causes the centerline of the boss to be located at a greater distance from the plane of the wall section than may be desirable.

BRIEF SUMMARY OF THE INVENTION

The present invention provides an improved form of a fastening assembly wherein molded synthetic resinous materials are used to join various structural members in abutting relationship. The assembly includes screw retaining bosses protruding from the back side of a wall section having an exposed appearance surface. The boss includes a longitudinally extending cavity which is generally parallel to the exposed surface of the wall section such that the thickness of the wall section centrally of the protruding boss remains relatively uniform. The cavity may be formed to receive fastening devices, or additional screw receiving passageways may be formed separate from the cavity. Other structural members are placed in abutting relationship with the terminal end of the boss members and a screw-fastening member is received in the screw receiving cavity or passageway, thereby securing the structural members together.

It is therefore an important object of the present invention to provide a plastic structural member having an external appearance surface and having one or more screw retaining bosses formed integrally with the member and protruding from the back side thereof whereby in the fabrication or molding of the structural member unsightly sink marks are prevented from appearing on the exposed surface by the provision of a cavity in the boss member, with at least a portion of the cavity located a distance from the exposed surface approximately equal to the thickness of the structural member.

It is a further object of the present invention to provide a fastening assembly of the type referred to above wherein a novel arrangement of the boss-relief cavity is such that the centerline of the screw-retaining opening is maintained a relatively short distance from the plane of the back surface of the structural member from which the bosses protrude. The screw-retaining opening may be either the cavity itself or a separate screw-receiving passageway.

It is still a further object to provide a fastener assembly for structural parts wherein the structural integrity of the assembly is retained while simultaneously eliminating unsightly surface blemishes normally associated with such parts.

BRIEF DESCRIPTION OF THE DRAWINGS

The foregoing and other objects and advantages will be more apparent when considered in connection with the accompanying drawings wherein:

FIG. 1 is a perspective view of an appliance cabinet such as a dishwasher which includes plastic structural members to which the subject invention applies.

FIG. 2 is a fragmentary cross-sectional view of an assembly incorporating one form of the subject invention taken along the line 2—2 of FIG. 1.

FIG. 3 is a fragmentary end cross-sectional view of one embodiment of the subject invention taken along the line 3—3 of FIG. 2.

FIG. 4 is a fragmentary side cross-sectional view of a prior art structural member such as that shown in FIG. 1.

FIG. 5 is a fragmentary end cross-sectional view of the prior art structural assembly taken along line 5—5 of FIG. 4.

FIGS. 6, 7, 8 and 9 are fragmentary end cross-sectional views of a plastic structural assembly illustrating additional embodiments of the subject invention.

DESCRIPTION OF THE PREFERRED EMBODIMENTS

Referring now to the drawings more in detail wherein like numerals have been employed to designate similar parts throughout the various FIGURES, it will be seen that structural members employing the fastening assembly of the type contemplated by the present invention are designated generally by the numeral 10 in FIG. 1. FIG. 1 is a partial view of a dishwasher cabinet 12, including a door 14 having an escutcheon assembly 16 including a door latch arm 18, a control knob 20, push-buttons 22, and a venting structure shown generally as 24. The escutcheon assembly 16 includes a plastic wall section 26 which is molded from a synthetic resinous material.

Referring to FIG. 2, the back wall 28 of the escutcheon assembly 16 is shown in abutting engagement with the wall section 26 having a predetermined thickness "L." Back wall 28 has an aperture 30 for receiving the screw member 32 therethrough. Member 28 is also in engagement with a plurality of bosses 40 which are molded integrally with the wall section 26 and protrude vertically downwardly therefrom, as is better seen in FIG. 3. The bosses 40 are generally cylindrical with flattened shoulders 41 depending vertically downward from the wall 26.

Positioned centrally within and extending longitudinally of the boss 40 is an opening including a screw-accommodating passageway 42. Passageway 42 is cylindrical and extends the entire length of the exposed appearance surface 27 of structural member 26. Located parallel to and intermediate of said wall section 26 and said passageway 42 is a longitudinally extending cavity or boss-relief portion 44. In the embodiment of the invention shown in FIG. 3, cavity 44 is generally of triangular cross-section and is shown to intersect the passageway 42 at the top thereof. Note that cavity 44 is formed so that at its dimension proximate the wall section 26 is such that the wall section is relatively uniform in thickness, i.e. the thickness of wall 26 remains at the dimension designated as "L" in FIG. 3.

By maintaining a relatively uniform thickness of wall section 26 at the location of the boss 40 the unsightly surface blemishes 127 shown in FIGS. 4 and 5 and in phantom in FIG. 1 are eliminated. That is, as can best be seen by reference to FIG. 5, the abrupt change in wall thickness from dimension L to dimension P at the center of the prior art bosses caused the surface blemishes or sink marks 127 to appear. It is believed that the increased mass of the boss at the center thereof caused the molten plastic resin to cool at a different rate, thus creating the sink marks to form.

The screw-receiving passageway 42 and the boss-relief cavity 44 are "cored" in the structure member 26 by providing the necessary inserts in the die cavities from which the structural members 26 are molded. Note that with the disclosed fastening assemblies the centerline of the screw-receiving passageway 42 is permitted to remain in relatively close proximity to the back side 29 of structural member 26 as is indicated in FIG. 3 by the letter D.

Referring to FIG. 6, one form of the invention is shown where the screw-receiving passageway and the boss-relief cavity are one and the same. That is, the boss 45 has only one opening 42 formed therein. Opening 42 is formed so as to receive a fastener such as screw 32 and is located a distance L from surface 27. Thus, there is no abrupt change in the thickness of wall 26 centrally of the bosses 45 and the centerline of the core remains close to the back 29 of wall 26.

Referring to FIG. 7, another embodiment of the invention is illustrated wherein the longitudinal cavity 54 is arcuate in cross-section radiating tangentially from the top of passageway 42. Note the dimension L is maintained centrally of the boss member which corresponds to the thickness of the wall section at other locations.

Another embodiment of the subject invention is shown in FIG. 8 wherein the longitudinal cavity 54 is circular in cross-section and is interconnected to passageway 42 by a small vertical section 66. Again, the dimension L between the circumferential upper portion of cavity 64 and the appearance surface 27 is maintained at the dimension L. Note that in the embodiment shown in FIGS. 3, 7 and 8 a portion of the threads of screw member 32 which are circumferentially larger than a cylindrical passageway 42 extend into the longitudinal cavities 44, 54, and 64, respectively, at the intersection of said cavities and the passageway 42. Although there is a slight loss in screw retention strength where the cavities and passageways 42 intersect, the loss is either tolerated or is otherwise compensated for.

In the embodiment shown in FIG. 9, the boss relief cavity 74 is of rectangular cross-section and is formed independently from the screw-receiving passageway 42. Again, the thickness L of the wall section 26 is maintained relatively uniform where the boss 40 is formed.

One skilled in the art will appreciate that by making a simple modification of a die normally associated with the fabrication of structural members made of molded plastic, the occurrence of unsightly sink marks may be eliminated. This is effected by reducing or minimizing the mass of the boss by formation of a cavity having a surface spaced from the exposed appearance surface of the structural member a distance approximately equal to the thickness of the wall section. With the fastening assembly and method of the subject invention, the centerline of the screw boss is permitted to be maintained in rather close proximity to the plane of the structural member which is an important requirement in many applications. Further, with the present invention the appearance of structural plastic members can be greatly improved with only a modest investment in tooling changes.

For the purpose of illustrating practical applications of plastic fastening assemblies constructed in accordance with the teachings of the present invention, certain specific embodiments have been disclosed and described herein. It should be understood, however, that the present invention contemplates other structural modifications and changes without departing from the spirit and scope of the appended claims.

What is claimed is:

1. A fastening assembly comprising first and second abutting structural members, said first member including a wall section of predetermined thickness and having at least one exposed surface; a mounting boss formed integrally with said wall section and extending from the opposite side of said exposed surfaces; said boss having a longitudinally extending cavity formed therein generally parallel to said exposed surface, said cavity disposed a distance from said exposed surface such that the thickness of the wall section centrally of said boss substantially equals the predetermined wall thickness; said boss further having a screw-receiving passageway formed therein independent of said cavity; and a screw positioned in said passageway securing said first and second structural members together.

2. The fastening assembly of claim 1 wherein said passageway and said cavity are formed so as to intersect circumferentially thereof.

3. The assembly of claim 1 wherein the cross-sectional shape of said cavity is generally rectangular.

4. The assembly of claim 1 wherein the cross-sectional shape of said cavity is generally triangular.

5. The assembly of claim 1 wherein the cross-sectional shape of said cavity is generally arcuate.

6. The assembly of claim 2 wherein the cross-sectional shape of said cavity is generally circular.

7. A fastening assembly comprising first and second structural members, said first member having at least one exposed surface; a mounting boss formed integrally with said first member and extending from the opposite side of said exposed surface; said boss having an asymetrical opening formed therein; said opening having a substantially cylindrical portion for receiving a screw therein and a longitudinally extending portion generally parallel to and intermediate of said cylindrical portion and said exposed surface, said longitudinal portion intersecting said cylindrical portion circumferentially thereof; and a screw positioned in said cylindrical portion securing said first and second structural members together.

8. The assembly of claim 7 wherein the distance between said exposed surface of said structural member and the longitudinally extending surface of said longitudinal portion proximate said exposed surface is substantially equal to the thickness of said structural member.

9. The assembly of claim 7 wherein the threads of the screw are circumferentially larger than the cylindrical portion of said opening, with at least a portion of said threads extending into said longitudinal portion of said opening at the intersection of said cylindrical and longitudinal portions.

10. A method of assembling two or more structural members, wherein at least one of said members is fabricated from plastic and having a wall section with an exposed appearance surface, comprising the steps of forming said wall section with one or more bosses protruding from the back side of said exposed surface; reducing the mass of said boss members by forming a cavity having a surface spaced from said exposed surface of said wall section a distance approximately equal to the thickness of said wall section; preparing the cavity for receiving a fastening device; and securing said wall section to another of said structural members by inserting a fastener device into said cavity.

11. The method of assembly of claim 10 including the additiinal step of forming a screw-receiving passageway in said bosses separate from said cavity and securing said wall section to another of said structural members by inserting a fastener device into said passageway.

12. A method of assembling two or more structural members, one of said members having at least one plastic wall section having an exposed appearance surface comprising the steps of forming said wall section with one or more mounting bosses protruding from the back side of said exposed surface; minimizing the change in wall thickness where the boss is integral with the wall section by preparing the bosses with asymetrical openings therein; said openings having (a) central portions which are adapted to receive fastening devices therein, and (b) boss-relief portions radiating from and tangential to said central portions such that the thickness of the wall sections on a plane generally perpendicular to the wall sections and passing through the axis of said central portions is substantially equal to the thickness of the wall section remote from said bosses; and securing said wall section to another of said structural members by inserting fastener devices into said central portions.

* * * * *